(12) United States Patent
Fitzgerald et al.

(10) Patent No.: US 11,366,961 B2
(45) Date of Patent: Jun. 21, 2022

(54) SYSTEMS AND METHODS FOR DOCUMENT PUBLISHING

(71) Applicant: MATHRESOURCES INCORPORATED, Halifax (CA)

(72) Inventors: Ronald Fitzgerald, Halifax (CA); Chris Malloy, Halifax (CA); Jonathan Kenney, Halifax (CA); David Robinson, Halifax (CA); Natasha Ching, Halifax (CA); Erin Van Slyke, Halifax (CA)

(73) Assignee: MATHRESOURCES INCORPORATED

( * ) Notice: Subject to any disclaimer, the term of this patent is extended or adjusted under 35 U.S.C. 154(b) by 15 days.

(21) Appl. No.: 16/900,247

(22) Filed: Jun. 12, 2020

(65) Prior Publication Data

US 2020/0394359 A1 Dec. 17, 2020
US 2022/0012419 A2 Jan. 13, 2022

(30) Foreign Application Priority Data

Jun. 14, 2019 (CA) .............................. CA 3046608

(51) Int. Cl.
*G06F 17/10* (2006.01)
*G06F 40/186* (2020.01)
(Continued)

(52) U.S. Cl.
CPC ............ *G06F 40/186* (2020.01); *G06F 40/14* (2020.01); *G06F 40/151* (2020.01); *H04L 67/02* (2013.01)

(58) Field of Classification Search
CPC ...... G06F 40/186; G06F 40/151; G06F 40/14; H04L 67/02
See application file for complete search history.

(56) References Cited

U.S. PATENT DOCUMENTS 7,721,202 B2 * 5/2010 Fuchs ................... G06F 16/88
715/239
8,954,456 B1 * 2/2015 Pierce .................. G06F 16/258
707/694
(Continued)

FOREIGN PATENT DOCUMENTS

CN 106294493 A 1/2017
CN 106802937 A 6/2017
(Continued)

OTHER PUBLICATIONS

Topping, Paul, Using MathType to Create TEX and MathML Equations, TUGboat, vol. 20 (1999), No. 3—Proceedings of the 1999 Annual Meeting (Year: 1999).*
(Continued)

*Primary Examiner* — Shahid K Khan
(74) *Attorney, Agent, or Firm* — Burr & Forman LLP; Ryan M. Corbett

(57) ABSTRACT

Methods and systems for publishing text files containing mathematical expressions to a web-ready file are disclosed. The web-ready file may be used for generating a web application, creating an offline file, etc. Template documents are received as text files having a template structure comprising a plurality of identifier fields and content fields, each content field associated with a respective identifier field, and data in at least one content field comprises a mathematical expression. The mathematical expression is converted to a first web language format within the template document. The template document is exported to a second web language format. The web-ready file is generated from the exported file by assembling contents of the exported file in accordance with the plurality of content fields and associated respective identifier fields defined in the template document.

23 Claims, 17 Drawing Sheets

(51) Int. Cl.
*G06F 40/151* (2020.01)
*G06F 40/14* (2020.01)
*H04L 67/02* (2022.01)

(56) References Cited

U.S. PATENT DOCUMENTS

| | | | | |
|---|---|---|---|---|
| 9,460,162 | B1 * | 10/2016 | Ostler | G09B 7/00 |
| 2003/0101416 | A1 * | 5/2003 | McInnes | G06F 40/174 |
| | | | | 715/234 |
| 2004/0117732 | A1 * | 6/2004 | McNeill | G06Q 10/10 |
| | | | | 715/229 |
| 2006/0136353 | A1 * | 6/2006 | Crockett | G06F 40/154 |
| 2008/0077854 | A1 * | 3/2008 | Alabi | G06F 40/177 |
| | | | | 715/236 |
| 2008/0256092 | A1 * | 10/2008 | Kano | G06F 40/103 |
| 2009/0019015 | A1 * | 1/2009 | Hijikata | G06F 16/951 |
| 2009/0110268 | A1 * | 4/2009 | Dejean | G06V 30/416 |
| | | | | 382/159 |
| 2010/0074527 | A1 * | 3/2010 | Vukosavljevic | G06F 40/171 |
| | | | | 382/187 |
| 2011/0213817 | A1 * | 9/2011 | Brothers | G06F 17/10 |
| | | | | 708/174 |
| 2012/0107779 | A1 * | 5/2012 | Halton | G06F 40/166 |
| | | | | 434/188 |
| 2013/0268263 | A1 * | 10/2013 | Park | G06F 40/30 |
| | | | | 704/9 |
| 2014/0173417 | A1 * | 6/2014 | He | G06F 16/986 |
| | | | | 715/234 |

FOREIGN PATENT DOCUMENTS

| | | | |
|---|---|---|---|
| JP | 2001282777 A | 10/2001 | |
| WO | WO-9946663 A2 * | 9/1999 | G06F 17/24 |
| WO | WO-2017136431 A1 * | 8/2017 | G06F 17/10 |
| WO | WO 2017/185649 | 11/2017 | |

OTHER PUBLICATIONS

Gebhard, Caitlin et al., Wrangling math from Microsoft Word into JATS XML workflows, Wiley Online Library: Sep. 19, 2016 (Year: 2016).*

* cited by examiner

| |
|---|
| TEXTBOOK_C01_TITLE |
| << Chapter 1 Title >> |
| TEXTBOOK_C01_L01_TITLE |
| << Chapter 1, Lesson 1 Title>> |
| TEXTBOOK_C01_L01_1 |
| << Section 1 text>> |
| TEXTBOOK_C01_L01_1_TYPE |
| text |
| TEXTBOOK_C01_L01_2 |
| << Section 2 examples>> |
| TEXTBOOK_C01_L01_2_TYPE |
| example |

| |
|---|
| TEXTBOOK_C01_TITLE |
| << Chapter 1 Title >> |
| TEXTBOOK_C01_L01_TITLE |
| << Chapter 1. Lesson 1 Title>> |
| TEXTBOOK_C01_L01_S01_TEMPLATE |
| TEMPLATE_01 |
| TEXTBOOK_C01_L01_S01_SIDE_IMAGE |
| << Image ID for side image. This is a custom property of TEMPLATE_01. >> |
| TEXTBOOK_C01_L01_S01_HINT_TEXT |
| << Text for hint bubble in margin. This is a custom property of TEMPLATE_01. >> |
| TEXTBOOK_C01_L01_S01_1 |
| << Use templated sections similar to Case Study 3 >> |

| 604 | 606 |
|---|---|
| 1000_field | value |
| 1000_child_name | child-1 |
| 1000_child_data | Some data here |
| 1000_multiple | multiple |
| 1000_multiple | values |
| 1000_multiple | here |

| 73200_text | Use the Distributive Property to write an equivalent expression. $$3(1.5x+5.2)$$ |
|---|---|
| 73200_type | FIB |
| 73200_response | <<1? DEC>> $x$ + <<2? DEC>> |
| 73200_answer_1 | 4.5 |
| 73200_tol_1 | 0.000000001 |
| 73200_answer_2 | 15.6 |
| 73200_tol_2 | 0.000000001 |
| 73200_dok | 1 |
| 73200_standard | CCSS.7.EE.A.1 |

| 73203_text | Simplify the expression. $$-9(0.3-5.2x)$$ |
|---|---|
| 73203_type | MC |
| 73203_random | true |
| 73203_answer | $46.8x-2.7$ |
| 73203_distractor | $-2.7x+46.8x$ |
| 73203_distractor | $-2.7-46.8x$ |
| 73203_distractor | $-14.2x-8.7$ |
| 73203_dok | 1 |
| 73203_standard | CCSS.7.EE.A.1 |

| 73205_text | Select all the expressions that are equivalent to the expression $$5.2(1.5-0.3x)$$ |
|---|---|
| 73205_type | MS |
| 73205_random | true |
| 73205_answer | $-1.56x+7.8$ |
| 73205_answer | $-4(0.39x-1.95)$ |
| 73205_answer | $(-5.2x+26)0.3$ |
| 73205_distractor | $6.7-4.9x$ |
| 73205_dok | 2 |
| 73205_standard | CCSS.7.EE.A.1 |

*FIG. 6F*

SYSTEMS AND METHODS FOR DOCUMENT PUBLISHING

TECHNICAL FIELD

The present disclosure relates to publishing documents and in particular to systems and methods for publishing text files containing mathematical expressions to a web-ready file.

BACKGROUND

Many authors, particularly in the educational space, generate content in a text file such as Microsoft® Word™ that they wish to have published as a web output (e.g. as a webpage, web application, etc.). However, existing techniques for publishing text documents to web files are manually driven and user intensive. Typically, a developer manually writes the contents of the text document in an appropriate web language format that is readable by a web browser for publishing the text document's content as a webpage or web application. In some instances, software programs exist that can convert the document's text into a desired web language format. However, this operation still involves a user using the software program to perform the conversion, and a developer is generally required for assembling the webpage or web application so that it can be presented in a manner desired by the author.

A further challenge exists when content or data in the text file to be published includes mathematical expressions such as mathematical formulas, equations, and/or symbols. Mathematical expressions written by a developer in the desired web language format is both time consuming and susceptible to user error. Additionally, current techniques for converting such mathematical expressions generate undesirable formatting which requires extensive user-editing beyond simply re-keying the expressions.

Accordingly, existing techniques for publishing text files require substantial user involvement and have several drawbacks that significantly reduce scalability and throughput of a publishing operation.

Systems and methods that enable additional, alternative, and/or improved publishing of text files containing mathematical expressions remain highly desirable.

SUMMARY

In accordance with an aspect of the present disclosure, a method of publishing text files containing mathematical expressions to a web-ready file is disclosed, comprising: receiving a template document as a text file having a template structure comprising a plurality of identifier fields and content fields, each of the content fields being associated with a respective of the plurality of identifier fields, wherein the content fields are authored with data, and the data in at least one content field comprises a mathematical expression; converting the mathematical expression to a first web language format within the template document; exporting the template document to a second web language format to generate an exported file; and generating the web-ready file from the exported file by assembling contents of the exported file in accordance with the plurality of content fields and associated respective identifier fields defined in the template document.

In a further aspect of the method, the method further comprises determining whether a format of the mathematical expression is compatible for converting to the first web language format, and if the format of the mathematical expression is not compatible, modifying the format of the mathematical expression to a format compatible for converting to the first web language format.

In a further aspect of the method, the method further comprises unencoding the mathematical expression in the first web language format from the second web language format in the exported file.

In a further aspect of the method, the first web language format is MathML.

In a further aspect of the method, the second web language format is HTML.

In a further aspect of the method, the web-ready file is generated in a third web language format, and the contents of the exported file are embedded within the third web language format.

In a further aspect of the method, the third web language format is any of JSON, XML, and SQL inserts.

In a further aspect of the method, generating the web-ready file in the third web language format comprises: generating a plurality of content snippets from the contents of the exported file, the plurality of content snippets corresponding to the content fields of the template document; and embedding, in the third web language format, the plurality of content snippets to generate the web-ready file in accordance with the respective identifier fields.

In a further aspect of the method, generating the web-ready file in the third web language format further comprises: saving the plurality of content snippets in non-volatile storage based on the respective identifier fields associated with the corresponding content fields; or buffering the plurality of content snippets in memory.

In a further aspect of the method, the plurality of identifier fields are defined according to the third web language format.

In a further aspect of the method, the method further comprises: creating a table of contents using a subset of the plurality of identifier fields or content fields; and including the table of contents in the web-ready file.

In a further aspect of the method, the method further comprises: processing the contents of the exported file to check each content field for errors; and if there is an error in the contents of the exported file, outputting a warning.

In a further aspect of the method, the method further comprises: processing the contents of the exported file to check each content field for image references; and adding images corresponding to the image references to the web-ready file.

In a further aspect of the method, the method further comprises one or more of: generating a new web application using the web-ready file; modifying an existing web application using the web-ready file; and creating an offline file from the web-ready file.

In a further aspect of the method, the template document is received through a web portal from a user.

In a further aspect of the method, the template structure is uniquely defined for a desired output of the web-ready file.

In a further aspect of the method, the template structure is one of a plurality of template structures that are pre-defined for standardized outputs of web-ready files.

In accordance with another aspect of the present disclosure, a document publishing system for publishing text files containing mathematical expressions to a web-ready file is disclosed. The document publishing system comprises a publishing server, configured to: receive a template document as a text file having a template structure comprising a plurality of identifier fields and content fields, each of the content fields being associated with a respective of the plurality of identifier fields, wherein the content fields are authored with data, and the data in at least one content field comprises a mathematical expression. The document publishing system also comprises one or more computer processing devices, configured to: convert the mathematical expression to a first web language format within the template document; export the template document to a second web language format to generate an exported file; and generate the web-ready file from the exported file by assembling contents of the exported file in accordance with the plurality of content fields and associated respective identifier fields defined in the template document.

In a further aspect of the system, the publishing server is further configured to: task a target computer of the one or more computer processing devices to perform one or more of: converting the mathematical expression, exporting the template document, and generating the web-ready file; or add one or more of the template document, the exported file, and the web-ready file to a message queue that the one or more computer processing devices are listening to.

In a further aspect of the system, the system further comprises a web front end providing a web portal through which the template document is received.

In a further aspect of the system, the system further comprises a storage repository storing and timestamping one or more of the template document, the exported file, and the web-ready file.

BRIEF DESCRIPTION OF THE DRAWINGS

Further features and advantages of the present disclosure will become apparent from the following detailed description, taken in combination with the appended drawings, in which:

FIGS. 5A-5D show examples of template documents in accordance with some embodiments;

FIGS. 6A-6F show examples of template documents in accordance with some embodiments;

It will be noted that throughout the appended drawings, like features are identified by like reference numerals.

DETAILED DESCRIPTION

Figure 1:
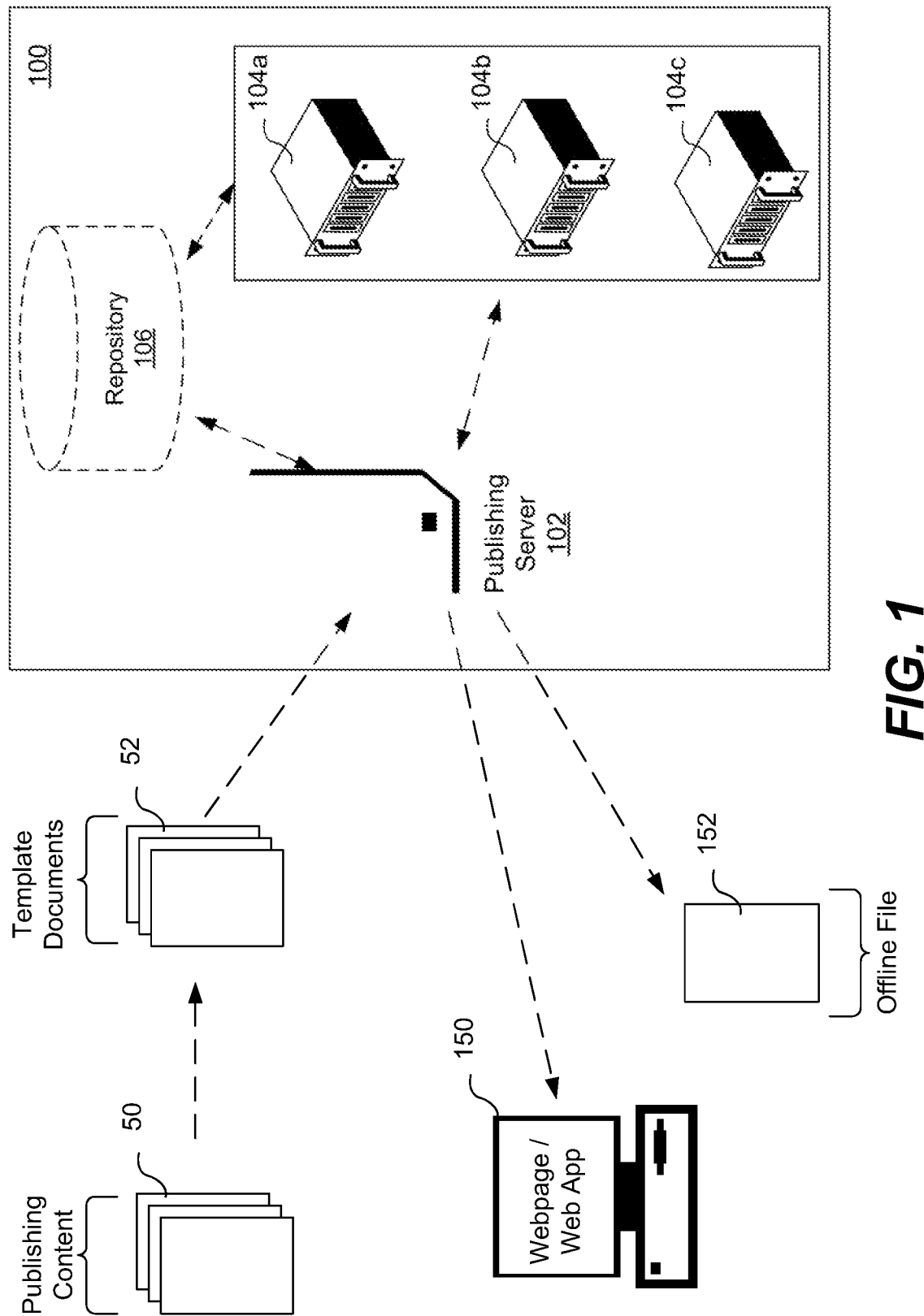
FIG. 1 shows a representation of a document publishing system for publishing text files containing mathematical expressions to a web-ready file.

The present disclosure provides systems and methods for publishing documents. More specifically, the systems and methods disclosed herein allow for publishing text files containing mathematical expressions to a web-ready file with minimal user involvement. The web-ready file is a file written in a web language format that can be used for example to create or modify a web application displayed on a webpage, and/or create an offline file such as an offline application or offline installer version, print textbooks, editable documents, etc. As non-limiting examples, the web-ready file published in accordance with the systems and methods disclosed herein may be used for publishing textbooks online, creating interactive quizzes and/or games in a web application, etc. The applications generated from the web-ready file can include any number of features, including but not limited to menus, searching, bookmarking, printing, assessments, etc. In some embodiments, the system may be provided as a service that users can access via a web portal and can log into, upload text files to be published, and receive the web-ready file as an output that can be used for generating a webpage or web application and/or an offline file. Additionally, in some embodiments the system may be integrated with a final website such that instead of a user uploading the web-ready files to the final website the user can upload the text files and the system will generate the final website by performing the conversion of the text files to the web-ready files.

Content that is desired to be published is authored in a template document, which is a text file that has a template structure comprising a plurality of identifier fields and content fields, with each of the content fields being associated with a respective identifier field. The use of a template document having a template structure results in a structured text file, which facilitates performing the publishing process in a substantially automated manner. The identifier fields of the template structure define the structure of the final output and are used for assembling the web-ready file. The content fields are authored with data that a user wishes to have published in a web format. The template structures may be uniquely defined for a desired output of the web-ready file, and/or there may be a plurality of template structures that are pre-defined for standardized outputs of the web-ready file, such as common types of applications (e.g. providing answers and solutions to chapters and lessons that may mirror a textbook, providing assessment quizzes, online textbooks, printing textbooks, etc.).

The identifier fields in the template document define the hierarchy/assembly of how the web-ready file is generated. These identifier fields allow for the customization and/or standardization of the template document according to the type or design of output desired. Accordingly, not only do the template documents provide a structured text file that ensures consistency and facilitates conversion to a web-ready file, but the structure of the template documents is also flexible to allow for generating different types of outputs. The document publishing systems and methods disclosed herein can thus generate outputs for various types of applications because any number of template structures with different interpretations of identifier fields can be supported.

On the other hand, the data in the content field is author-specific for the matter being published. For example, once the template structure is agreed upon/selected (i.e. the structure of the identifier fields and content fields in the template document are determined), a template document may be authored with the content fields comprising the content that the author wishes to have published. As an example, a template document that is being used for generating an online textbook may contain an identifier field for "Chapter 1 Title", and the content field associated with this identifier field may be populated with the title for Chapter 1, e.g. "Slope". Among other things, the data in the content field may comprise a mathematical expression, including a mathematical formula, equation, and/or symbol. For example, an identifier field may indicate "Chapter 1 Lesson 1 Equation 1", and the content field associated with this identifier field may be populated with the equation "y=mx+b".

In accordance with the systems and methods disclosed herein, mathematical expressions in the template document are able to be exported from the text file to a web-ready output file without losing desired formatting. Mathematical expressions are converted in the template document into a first web language format that supports mathematical notations. The template document, including the mathematical expression in the first web language format, is then exported to a second web language format to generate an exported file that encompasses both textual data from the template document and the converted mathematical expression. Accordingly, mathematical expressions do not need to be manually written or edited/re-keyed in a desired web language format, but instead can be exported directly from the text document. Additionally, any errors that are identified in the mathematical expression in the exported file, such as errors caused by the exporting of the mathematical expression (which may sometimes occur, such as for characters not encompassed by ASCII), can be efficiently corrected without manual re-typing of incorrect expressions, as described in accordance with the systems and methods disclosed herein.

The document publishing systems and methods disclosed herein thus reduce the amount of user involvement and can increase throughput and scalability of the publishing operation. Additionally, quality assurance can be deferred until the last stage when the web-ready file is used to view content in the final web application or offline file. If there are any changes that need to be made, edits can be made directly to the template documents and a revised web-ready file can be published accordingly. Thus, the systems and methods disclosed herein allow for small edits to be made any number of times, allowing for authors of content to implement a continuous improvement model with much less cost associated with QA failure.

Embodiments are described below, by way of example only, with reference to FIGS. 1-9.

FIG. 1 shows a representation of a document publishing system 100 for publishing text files containing mathematical expressions to a web-ready file. The document publishing system 100 comprises a publishing server 102 and one or more computer processing devices 104a-c (which may for example be a computer or a server). The document publishing system 100 may also comprise a storage repository 106 depending on the configuration of the system, as described in more detail herein.

As depicted in FIG. 1, the publishing server 102 is configured to receive template documents 52. The template documents are a text file, such as a Microsoft® Word™ document, Google® Docs™ file, etc. The template documents 52 are authored with publishing content 50 that is desired to be published. The template documents 52 may be authored directly with the content that is desired to be published, or additionally/alternatively, the publishing content 50 may exist as a separate file that is used to author the template documents 52. In the embodiments disclosed herein, the content of the template documents 52 contain at least one mathematical expression.

Previous attempts to generate a web-ready file in a web language format from a text file required substantial user involvement and had several limitations. Performing such a conversion of the contents in the text file to a web-ready file thus generally involved extensive user input, which introduces error and reduces the efficiency, scalability, and throughput of publishing documents. However, using template documents 52 having a template structure as defined herein provides a structured format that facilitates publishing the text file as a web-ready file more efficiently and with minimal user intervention.

Each template document 52 is a text file with a template structure that comprises identifier fields and content fields, where each content field is associated with a respective identifier field. The identifier fields define the configuration of the desired output (e.g. the design of a web application, and how content is to be presented), and accordingly may be customized depending on the needs of the author or selected from a pre-defined standardized template structure. The content fields define the content that is to be presented in the output, and these content fields are authored with content to be published (e.g. publishing content 50). The template structure, and thus the template documents 52, may therefore be customized specifically to a desired output of the publishing operation (e.g. a web application having a particular design), or may be pre-defined for common types of outputs. Examples of template documents will be further described with reference to FIGS. 5A-D and FIGS. 6A-F.

The document publishing system 100 is configured to generate a web-ready file from the template documents 52. The web-ready file may in turn be used to create a webpage and/or web application for the user that can for example be copied to a client webpage for viewing by an external device 150. Additionally or alternatively, the web-ready file may be used to create an offline file 152 such as an installer version of a web application for various operating systems, a PDF of a textbook, etc.

The template documents 52 are received by the document publishing system 100 at publishing server 102. In some embodiments, the publishing server 102 may provide a web portal with a user interface that allows users to upload the template documents 52 using an external device (not shown) for reception by the publishing server 102, and via which the web-ready files are outputted. For example, users can log into the site and drag-and-drop the template documents 52 to submit them for publishing, and when the web-ready file has been generated, the user can preview the output and also download the file for a complete export. In other embodiments, the publishing server 102 may be integrated with a final website such that instead of a user uploading the web-ready files to the website the user can upload the text files and the system will generate the final website by performing the conversion of the text files to the web-ready files. To provide such functionality, the publishing server 102 may comprise a web front-end running a framework such as Java® Spring Boot™ and/or Angular™, for example. In a non-limiting example implementation, the web front-end may include front-end and back-end code, a Mongo® database, and/or a PostgreSQL® database, for example.

Having received the template documents 52, the publishing server 102 facilitates the publishing of the template documents to a web-ready file with the computer processing devices 104a-c.

As a non-limiting example, in one implementation the publishing server 102 may be running Jenkins™ software tasked to perform multiple functions outside of conventional use. As another non-limiting example, the publishing server 102 in another implementation may act as a message broker running RabbitMQ®. The computer processing devices 104a-c may be running various operating systems including Windows®, Macintosh®, and/or Linux™.

The publishing server 102 may be configured to manage multiple tasks for publishing the template documents 52 to generate the web-ready file, and triggers execution of these tasks in a proper order as well as checks for failures. The publishing server 102 can be configured to interface with the computer processing devices 104a-c to manage such tasks. The document publishing system 100 may also comprise a storage repository 106, which may for example be a GIT™ repository, that the publishing server 102 can access and communicate with. The publishing server 102 may also send notifications to a user of the document publishing system 100 when tasks are completed successfully or result in error.

The template documents 52 may be stored in the storage repository 106. The storage repository 106 may be configured to track revisions to files by timestamping all files stored therein and archiving old files. The publishing server 102 may poll the storage repository 106 at predetermined time intervals (e.g. once every minute) for changes to determine when files have been updated, which may for example initiate certain tasks in the document publishing process. Additionally or alternatively, the storage repository 106 may send notifications to the publishing server 102, through the use of "post-receive hooks", for example.

The publishing server 102 may task the one or more computer processing devices 104a-c to execute aspects of the document publishing processing, including processing of the template documents 52, exporting the template documents 52, processing exported files, and generating a web-ready file from the exported files. A method of publishing text files containing mathematical expressions to a web-ready file will be further described in more detail herein. When tasking a computer processing device 104a-c the publishing server 102 may copy the required file from the storage repository 106 to the appropriate target computer processing device. During this process, the computer processing devices 104a-c may also store files such as the exported files and/or the web-ready file in the storage repository 106 once they have been generated. The storage repository 106 may be configured to automatically notify the publishing server 102 when files are received at the different stages of the publishing process, which can trigger the publishing server 102 to implement the next stage of the process.

In other implementations of the document publishing system 100, once the template documents 52 are received at the publishing server 102 they may be put in a message queue. The computer processing devices 104a-c may be listening to this queue and perform tasks for the document publishing. When a task is completed, the file may be put into another message queue so that another of the computer processing devices 104a-c, or the publishing server 102, can fetch it. For example, one or more of the computer processing devices 104a-c may be listening to a queue for taking the template documents and exporting them to generate an exported file. The exported file may then be put into another message queue that another of the computer processing devices 104a-c may be listening to for taking the exported file and generating the web-ready file. In this implementation of the document publishing system 100, there may be no storage repository 106 for archiving files. The one or more computer processing devices 104a-c may for example comprise an API Server running Java® Spring Boot™ which listens to the message queue, downloads the file, runs a corresponding program, and sends the result into another message queue. A corresponding program for exporting the template document may for example be in .NET C#. In some instances, the publishing server 102 may itself be configured to perform some of the processing.

The document publishing system 100 may be configured with further software to execute specific scripts and perform various functionality for publishing text files containing mathematical expressions to a web-ready file, as further described herein. For example, technologies used in the document publishing system to publish text files may further include PowerShell®, Microsoft® Word™, Microsoft® Word™ macros, MathType™ AutoIT™, Bash™, Python™, JSON™, etc. It will be readily appreciated by a person skilled in the art that the use of the technologies noted above and described herein with reference to certain embodiments/implementations are provided for the sake of example only and relate to just one possible implementation and configuration of the document publishing system 100, and that different technologies may be used where appropriate to perform similar functionality as described herein.

The document publishing system 100 thus provides a system that can receive a template document as a text file and publish a web-ready file with minimal user interaction. Additionally, as described in more detail herein, the document publishing system 100 can fully handle situations where mathematical expressions are present in the template documents 52. The reduced reliance on a user can mitigate user errors as well as make the entire document publishing process more efficient through automation of tasks.

Each of the publishing server 102 and computer processing devices 104a-c comprise hardware elements such as a processing unit, non-transitory computer-readable memory, non-volatile storage such as a hard disk drive, input/output interfaces, communication interfaces, etc. The non-transitory computer readable memory may store software such as computer programs in the form of computer-readable instructions that are executable by the processing unit and configure the publishing server 102 and computer processing devices 104a-c to perform certain functionality as part of the document publishing system 100. The communication interface may allow the publishing server 102 and computer processing devices 104a-c to communicate with each other, the storage repository 106, and external devices, over a variety of communication networks.

While a single publishing server 102, three computer processing devices 104a-c, and a single storage repository 106 are depicted in FIG. 1, a person skilled in the art will readily appreciate that the document publishing system 100 may comprise a different number of these elements to perform the processing as described herein. For example, it would be appreciated that the publishing server 102 may comprise separate servers for providing a web front-end, for facilitating the publishing operation, and/or for performing other tasks. Further, the skilled person would appreciate that the number of these hardware elements in the document publishing system 100 may vary depending on the particular implementation, the scale, and/or the throughput of the publishing operation. A person skilled in the art would readily appreciate that the scale and throughput of the publishing operation may, for example, be increased through the addition of more computer processing devices and appropriate provisioning of the publishing server 102 and storage repository 106 (when implemented).

Figure 2:
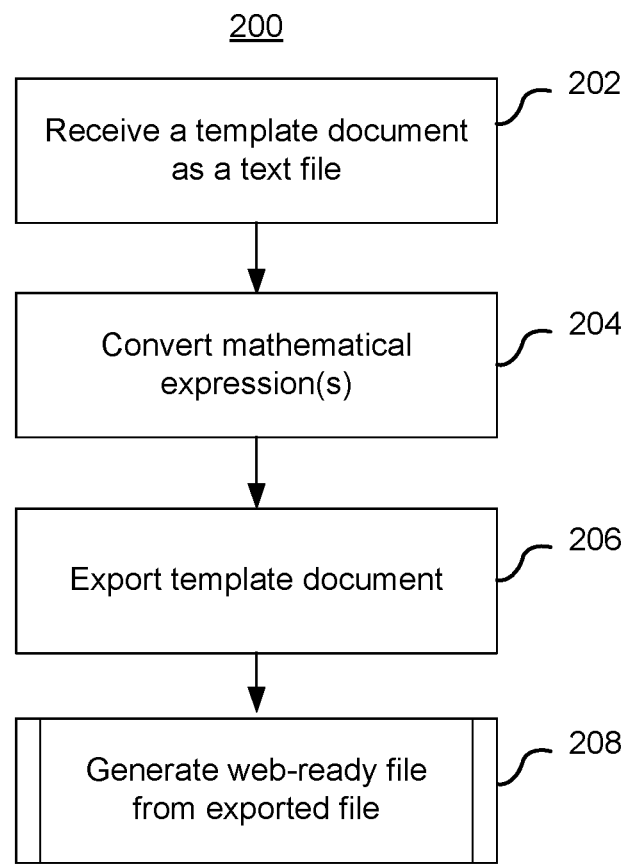
FIG. 2 shows a method of publishing text files containing mathematical expressions to a web-ready file.

FIG. 2 shows a method 200 of publishing text files containing mathematical expressions to a web-ready file. The method 200 can be executed by the document publishing system 100 depicted in FIG. 1.

The method 200 comprises receiving a template document as a text file (202). For example, the template document may be received by the publishing server 102 through a web portal. As further described with reference to FIGS. 5A-D and FIGS. 6A-F, each template document has a template structure that comprises a plurality of identifier fields and content fields, with each content field being associated with a respective of the plurality of identifier fields. The content fields are authored with data to be published. In the method 200, data in at least one content field of the template document comprises a mathematical expression. The template document may be generated from a text file containing content that an author wishes to have published as a web-ready file. In some embodiments, a text file that an author wishes to have published may be modified into the template document, or the template document may be a separate document altogether and the text file that the author wishes to have published may be used to author the template document. The template document may initially be pre-processed to remove any potentially bad content, comments in the document, turn off document tracking, etc. Images in the template document may also be deleted and provided with placeholders. The template document may be stored in the storage repository 106.

The mathematical expression(s) in the template document are converted to a first web language format (204). The first web language format is one that supports mathematical notations, such as MathML. If the template document is received as a Microsoft® Word™ document the mathematical expression(s) may be exported to MathML using a MathType™ HTML export in Microsoft® Word™, or by using MathType™ directly.

Where MathType™ is used directly, a computer of the one or more computer processing devices 104a-c may run a program that starts MathType™ and converts all of the MathType™ and Word equations in the template document into MathML.

Where a MathType™ HTML export in Microsoft® Word™ is used, a PowerShell™ script may be executed that opens Microsoft® Word™ and instructs Word to execute a Word Macro that initiates the conversion process. In this particular example, since the MathType™ HTML Export (also known as a "Math Page") does not have a scriptable interface, an AutoIT™ script may also be launched to automate tasks that do not have scriptable interfaces, such tasks involving operations such as moving the mouse to click buttons, typing text into text boxes, etc. The AutoIT™ script is written to click on the various buttons and type in the correct file names so that the MathType™ HTML export will complete. The publishing server 102 may be programmed to task this conversion to a computer of the one or more computer processing devices 104a-c. The publishing server 102 may retrieve the template document from the storage repository 106 and copy it to the target computer. The template document with the mathematical expression converted to the first web language format may be saved to a "converted" folder in the storage repository 106.

A determination may need to be made as to whether a format of the mathematical expression is compatible for converting to the first web language format. The mathematical expression(s) in the template document are identified and their format is assessed to determine if the mathematical expression(s) are compatible for converting to the first web language format. In some embodiments, such as where a template document is received as a Microsoft® Word™ document and a MathType™ HTML export is used to export the mathematical expression(s) into MathML, to use this export functionality any equations written in Microsoft® Word Equation Editor™ may need to be converted to a MathType™ equation. Accordingly, in this example a determination may be made to assess whether the mathematical expression(s) in the template document are written using Microsoft® Word Equation Editor™ or are written as a MathType™ equation.

If the format of the mathematical expression(s) is not compatible for converting and needs to be modified, the mathematical expression(s) is/are modified to a format that is compatible for converting to the first web language format. For example, mathematical expression(s) in the template document that are written using Microsoft® Word Equation Editor™ may be converted to a MathType™ equation for use in exporting.

The template document is exported to a second web language format (206). The second web language format may for example be HTML. If the template document is received as a Microsoft® Word™ document, the template document may be exported to HTML using an HTML export functionality in Microsoft® Word™.

One of the computer processing devices 104a-c may be tasked by the publishing server 102 with exporting the template document. For example, the publishing server 102 may copy the template document from the storage repository 106 to a target computer of the one or more computer processing devices 104a-c. The exported files may then be automatically saved in the storage repository 106, for example to an "exported files" folder, and timestamped.

In other implementations for exporting the template document to generate the exported file, the template document may be placed in a message queue at the publishing server 102 for retrieval by the one or more computer processing devices 104a-c listening to the queue. The computer processing device may run a program that starts Microsoft® Word™ and converts the Word file to HTML and the MathML. The exported file is placed into another message queue for further processing.

Additionally, after exporting the template document to the second web language format (e.g. HTML), the mathematical expression in the first web language format (e.g. MathML) may be unencoded from the second web language format in the exported file. This is because the conversion to HTML converts any HTML reserved characters to HTML entities. Since the mathematical expression written in MathML was correct prior to exporting the template document to HTML, the exporting is reversed for the mathematical expressions written in MathML.

A web-ready file is generated from the exported file (208). Generating the web-ready file from the exported file involves assembling the contents of the exported file in accordance with the content fields and associated respective identifier fields that were defined in the template document. In addition, a table of contents may be created using a subset of the plurality of identifier fields and/or content fields defined in the template document. This table of contents may be included in the web-ready file.

The published web-ready file may be used to generate or modify a web application (e.g. interactive textbook, online quizzes/assessments, education games, etc.) or offline file (e.g. an offline application or installer version, a print or PDF of a textbook with various interactivity, etc.). Where a new or custom web application is built using the web-ready file the method may further comprise assembling the web application and copying to a website for viewing. Alternatively, if a user wishes to generate or modify a web application themselves then the final product provided by the document publishing system 100 may simply be the web-ready file. Still further, the web-ready file may in turn be used to generate an editable document or a text document (i.e. the web-ready file may be used to generate both print and digital content). The web-ready file may be automatically saved in the storage repository 106 when used in the system 100, for example to a "web-ready file" folder, and timestamped.

Figure 3:
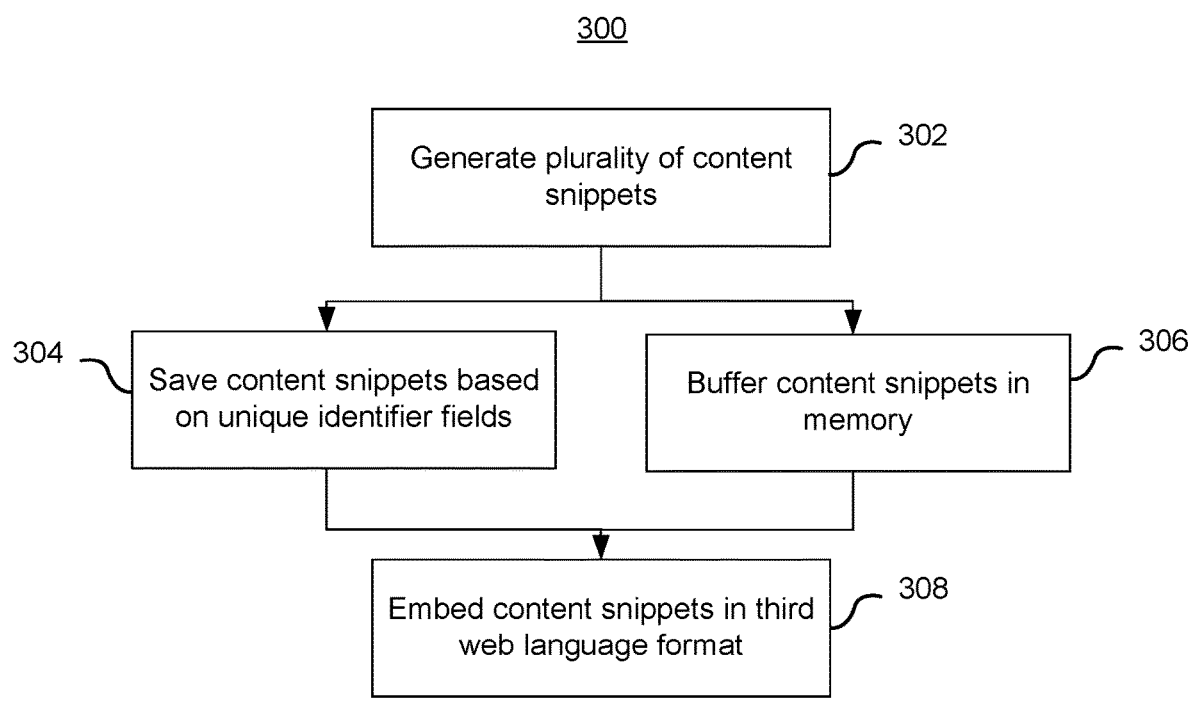
FIG. 3 shows a method for generating the web-ready file in a third web language format.

The web-ready file may be generated in a third web language format, including but not limited to XML, JSON, and SQL inserts, which better facilitates storage and transportation of the data in the web-ready file as compared to HTML, for example. FIG. 3 show a method 300 of generating the web-ready file in the third web language format.

In the method 300, a plurality of content snippets are generated from the exported file (302). The plurality of content snippets in the second web language format correspond to the content fields of the template document converted in the exported file. Each of the plurality of content snippets may be saved to the disk of the computer performing the generation of the web-ready file with their unique identifier field as their filename (304). Alternatively, the plurality of content snippets may be buffered in memory (306). The content snippets are embedded in the third web language format to generate the web-ready file in accordance with the respective identifier fields (308).

In an example implementation, a Bash™ script may be triggered for executing tasks on the one or more computer processing devices 104a-c such as deleting old web-ready files stored in the storage repository 104, and triggering various other scripts (e.g. Python™ scripts) for performing tasks involved in publishing of the exported file. A Python™ script may be executed to transform each of the exported files into the plurality of content snippets with their unique identifier field as their file name. Further, the content fields in the exported file may be scanned for common errors, and a warning printed to a user console if any are found. Additionally, the content fields in the exported files may be checked for image references, and any requested images may be added to a spreadsheet for incorporation in the web-ready file. Later, the spreadsheet may be consulted to ensure that the user/author has provided all required images. The Bash™ script may trigger another Python™ script that assembles the contents of the exported file into the third web language format by embedding the content snippets into the data structure of the third web language format.

An abstract tree state may be built from the contents of the exported file to navigate the contents of the exported file. For example, the Python script may use a python library called lxml may be used to read the HTML file and build the abstract state tree of the HTML contents based on the plurality of identifier fields and content fields from the template document. The abstract state tree can be navigated to locate the respective content fields based on the originally defined template structure, and the content can be extracted from the exported file and added to the output structure (in the third web language format).

Saving the plurality of content snippets to disk may help to locate errors in large files. If the export process crashes then a back-end user of the system would be able to look at whatever the last snippet generated was in order to determine the exact spot where the publishing process terminated. Additionally, by saving the plurality of content snippets this allows for content snippets to be combined from multiple files. However, generating the web-ready file in this manner requires that the identifier fields in the template documents be unique. If there is a user error in creating duplicate snippet IDs, content snippets from one source file may overwrite content snippets from another during assembly.

Alternatively, buffering the plurality of content snippets in memory permits using non-unique identifier fields while still being able to uniquely identify content snippets as a logical group based on the context of the template document, similar to how they are visually grouped in the template documents. This allows more flexibility with developing identifier fields when defining the template structure. This process is thus less susceptible to user error. Error logs may still be generated as well to determine any error points.

Figure 4:
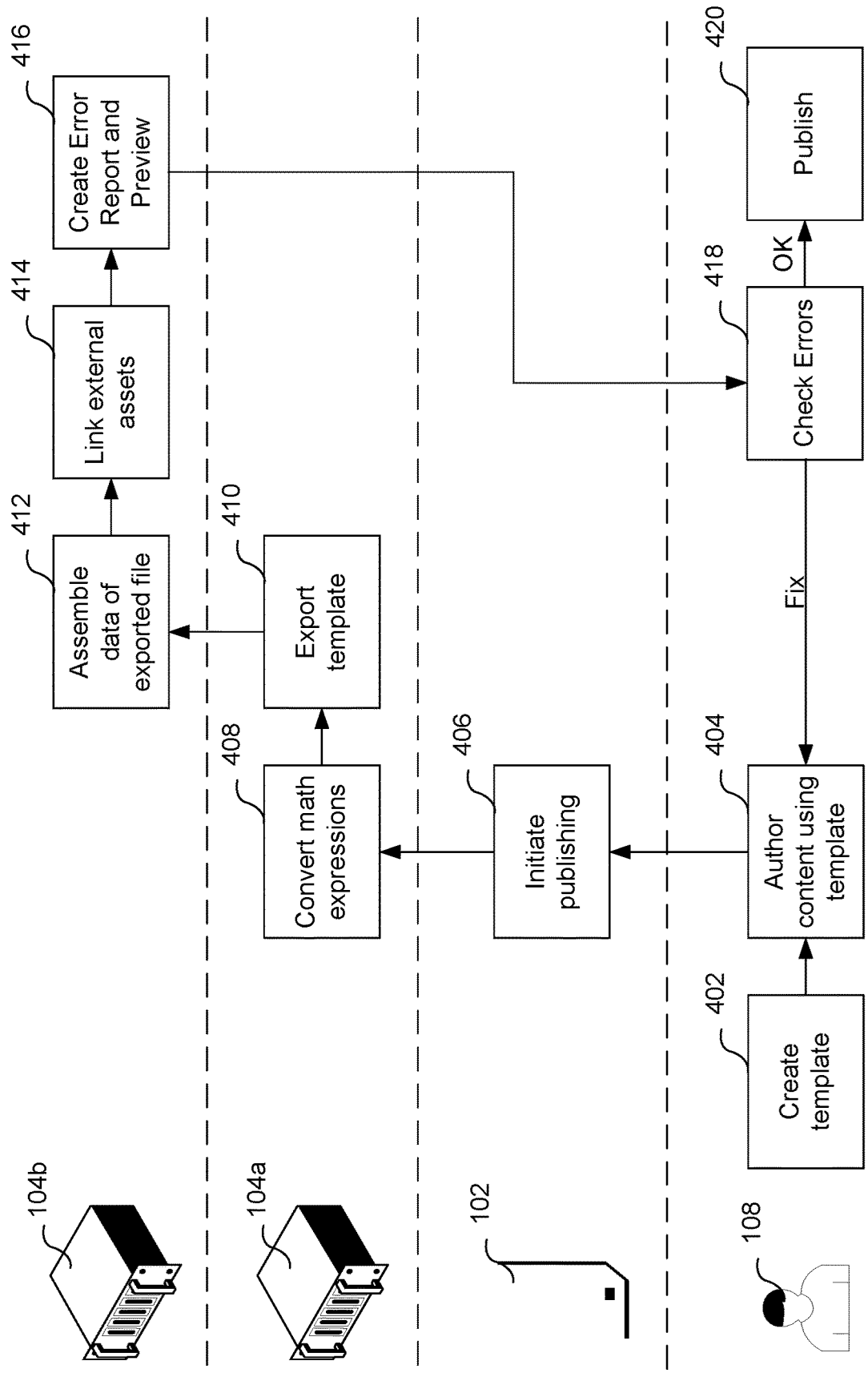
FIG. 4 shows a process flow diagram of how the document publishing system publishes a text file containing mathematical expressions to a web-ready file in accordance with some embodiments.

FIG. 4 shows a process flow diagram of how the document publishing system publishes a text file containing mathematical expressions to a web-ready file in accordance with some embodiments. For the sake of explanation of the document publishing process, FIG. 4 shows different functions performed by the publishing server 102, computer processing devices 104a and 104b, and a user 108 of the document publishing system. In some implementations, the computer processing device 104a may be running Windows™ or Macintosh™ operating system, while the computer processing device 104b may be running Linux™. A person skilled in the art will readily recognize that the implementation depicted in FIG. 4 is simply one example of how the document publishing system could be configured and that other implementations are possible without departing from the scope of this disclosure.

A template document is created (402). As previously described, template documents have a template structure which may be standardized for common types of applications/outputs, or may be customized for a particular type or design of application/output. For example, the user 108 may log into a web portal provided by the document publishing system 100 and select a standardized template structure for a desired output. The user 108 may then modify the template structure (e.g. deleting certain identifier fields that are superfluous, adding other identifier fields, etc.) for their particular application. The template documents at this stage may comprise identifier fields and associated content fields, with no data contained in the content fields. The template document is authored with content (404). Particularly, content/data that the user 108 wishes to have published may be added to the appropriate content fields corresponding to respective identifier fields. The template document is provided to the publishing server 102.

The publishing server 102 initiates the publishing operation for generating the web-ready file from the template document (406). The publishing server 102 may scan for changes to the template document by accessing files stored in the storage repository 106 and launch, for example, a PowerShell™ script to check for file modifications. If any files are found to be out of date (for example the file has been changed since the timestamp of the file stored in the storage repository), the PowerShell™ script may automatically launch the publishing process (i.e. converting mathematical expressions, exporting the template document, and publishing the web-ready file). For example, the publishing server 102 may determine that the received template document is a new document or an edited document. In other implementations, such as where the publishing server 102 acts as a message broker, upon receipt of the template document the template document may be added to a message queue for processing by the computer processing devices.

In the depicted process flow of FIG. 4, computer processing device 104a converts mathematical expressions in the template document (408) and exports the template document (410). Example implementations of how the computer processing device 104a may execute such tasks have been previously described with reference to FIG. 2.

In the depicted process flow of FIG. 4, computer processing device 104b publishes the exported file and performs post-processing tasks. For example, the exported file may be saved to storage repository 106, which in turn triggers the publishing server 102 to task computer processing device 104b to generate the web-ready file. Alternatively, the exported file may be placed in another message queue that the computer processing device 104b is listening to. Computer processing device 104b assembles the contents of the exported file (412) in accordance with the content fields and associated respective identifier fields defined in the template document. Any external assets (for example, images to be included in the web-ready file) are linked (414). The computer processing device 104b may also scan for errors in the generated web-ready file and create an error report for preview by the user 108 (416).

The user 108 may be presented with a preview of possible errors, if any (418). If the user 108 elects to fix an error they may update the content of the template document (404). In some instances, a programmer of the document publishing system 100 can perform an error handler to the scripting process, which would only need to be done once for all errors of a given type. If there are no errors, or if the user chooses not to fix the errors identified in the error report, then the web-ready file is generated/published (420), which can in turn be exported and used to create web applications, offline files, etc.

FIGS. 5A-5D show examples of template documents in accordance with some embodiments. In the example template documents shown in FIGS. 5A-5D each identifier field associated with respective content fields is unique.

Figure 5A:
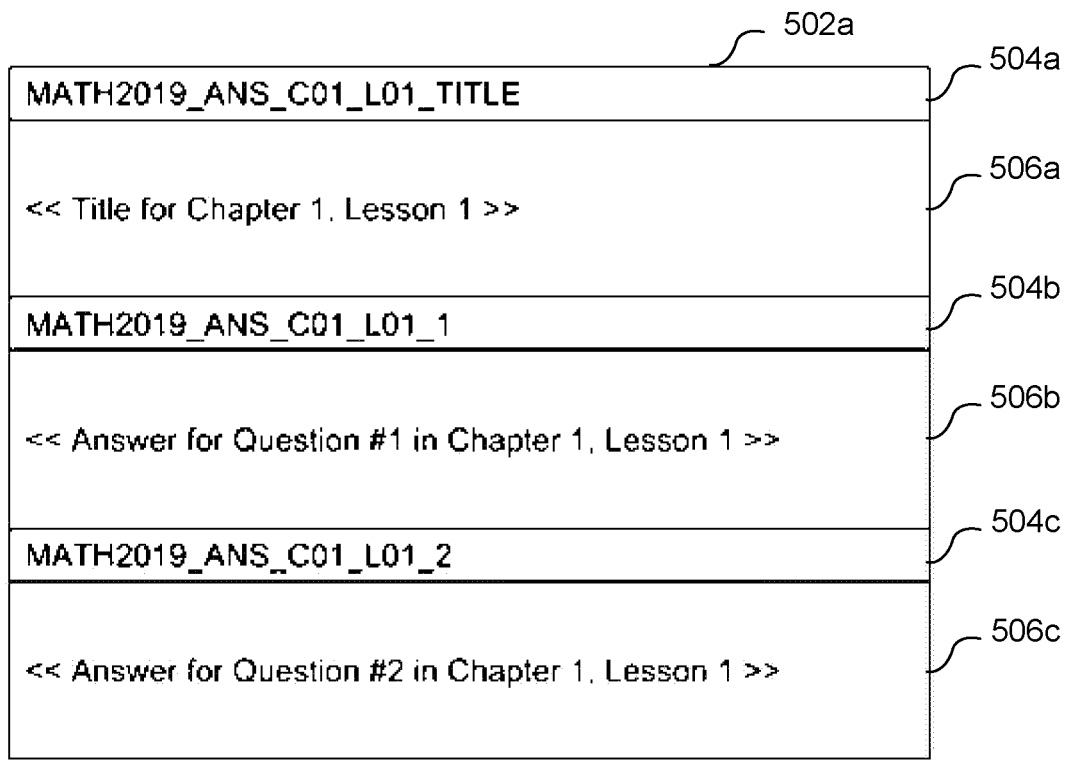

FIG. 5A depicts an example template document 502a for developing a web-ready file that presents answers and solutions which mirror a textbook. In this example, the author wishes to display the answers and solutions to any questions that were in the textbook, and organize them according to the same table of contents for easy lookup. The template document 502a comprises identifier fields 504a-c associated with respective content fields 506a-c. Content field 506a is associated with identifier field 504a and provides data indicating the title for Chapter 1, Lesson 1. Content fields 506b-c are respectively associated with identifier fields 504b-c and provide data indicating the respective answers for questions 1 and 2 in Chapter 1, Lesson 1. During publishing of the template document after it has been exported, a table of contents can be generated where some or all of the unique identifier fields 504a-c and/or content fields 506a-c are used to generate the table of contents. The content fields 506a-c can be organized appropriately in the web-ready file. The web-ready file published from the template document 502a may be used to build a web application that has a menu system to navigate the table of contents, searching, bookmarking, printing, etc. Any number of other custom features could be added. The web-ready file could additionally or alternatively be used to create an offline installer versions for PC, Mac or Linux.

Figure 5B:
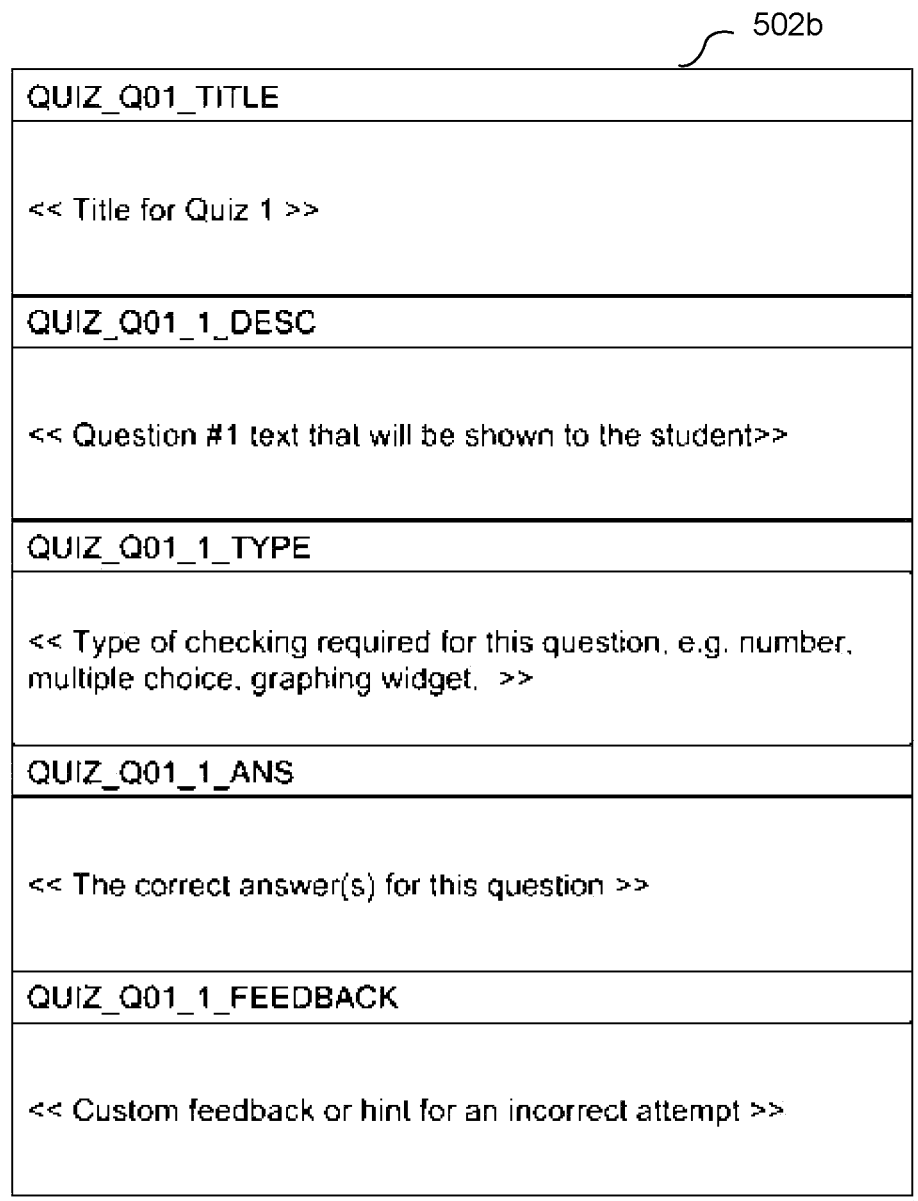

FIG. 5B depicts an example template document 502b for developing a web-ready file that can provide a program for doing online quizzes and recording assessments of student responses. In this example, the template 502b is configured to provide an ID to each quiz, number each question, and provide some metadata on how to check each answer for correctness. A web-ready file published from the template document 502b may be used to build a web application that serves the quizzes to students and checks the answers. The web application could include any number of custom responses types, from a simple textbox for a numerical answer, multiple choice, graphing widgets, fill-in-the-blanks, etc. Results may be saved by submitting the progress and final results to a designated server.

FIG. 5C depicts an example of a template document 502c for building a complete online textbook. Each lesson will contain many different potential elements such as: text with math expressions, asides, example sections, and images with captions. Each of these elements may be provided in a respective content field having a respective identifier field. The content fields may all blend together with no border between them, but each content field may be marked with metadata for special styling. For example, one content field can be marked as an example section, which can have a special green box styling with extra margin on the left.

A table of contents may be generated that is based on chapters and lessons, and accordingly may be generated using only some of the identifier fields and/or content fields. For example, the table of contents may be created using identifier fields ending in "TITLE", where the template document 502c is arranged so that only chapter titles and lesson titles have identifier fields ending in "TITLE".

A web-ready file published from the template document 502c may be used to build a web application that displays the textbook and provides navigation, bookmarking, searching, text highlighting, personal annotations. Multiple themes can be built to work with the same content, so content can be styled differently depending on the device it is viewed on, e.g. an iPad® or Kindle®. Or, the styles could be used to distinguish grade level for a program that spans multiple grades.

FIG. 5D depicts an example of a template document 502d for building a high-quality PDF textbook that can be printed. All content will be positioned exactly but, will tolerate some variability in line count. In this scenario, multiple template documents may be created to accommodate the many page layouts required. Each template may be configured to fit content onto a specific number of pages, with detailing, images, margin notes, etc., all specified. All images provided by an author should be either SVG, or at least a resolution that will match the DPI of the printer being used.

The content fields populated with data (e.g. textual, mathematical expressions) within each template could be blended together similar to the template document 502c depicted in FIG. 5C. This would allow for adding global styles to various elements without it being a specific feature of the current template document. However, the current template document can be made to override global styles.

A web-ready file published from the template document 502d may be used to build a web application with CSS styles and layouts for each and every template. The CSS layouts may be planned in advance of creating the matching templates that are text files, but they need not be finalized. After the publishing operation has started the final result can be previewed and changes to either the content fields or the CSS made iteratively. The web application could allow for viewing this preview and navigate between one or two pages (left and right) at a time, zooming in, and bookmarking pages (to share bookmarks with QA). Size checks could be added to a post-processing procedure to alert if any content is overflowing its' page and need to be shortened or moved.

Finally, the web application could convert the complete textbook to PDF for printing. If multiple editions are required (e.g. Domestic and International versions), color and image changes can be made at the CSS level, reusing the existing text files and CSS layouts. If changes to the layout are required (e.g. printing to different sized paper), the CSS layouts can be updated and, the text files reused.

FIGS. 6A-6F show examples of template documents in accordance with some embodiments. In the example template documents shown in FIGS. 6A-6F the identifier fields are defined according to the third web language format and essentially recreates a subset of the third web language format specification to facilitate embedding the contents of the exported file in the third web language format. The template documents shown in FIGS. 6A-6F generalizes the identifier field concept so that it can be used in a variety of programs and the document publishing system will mostly ignore any errors in the identifier fields and just pass these through to the final output stage. This makes quality assurance easier since the output can be viewed to try and identify the error, rather than the system just halting with an error message if there is an incorrect identifier field. The example template documents having identifier fields defined in this structure may also be more reusable as opposed to requiring high levels of customization for each client.

As an example, a JSON object has a format as follows:

```
{
    "id": 1000,
    "field": "value",
    "child": {
        "name": "child-1",
        "data": "Some data here"
    },
    "multiple": ["multiple", "values", "here"]
}
```

Using the underscore character as an ID delimiter a piece of a JSON object can be represented by appropriately defining the identifier fields in the template document, and then multiple pieces may be joined together to form a complete object. The underscores in the identifier field are used to represent descent into the JSON object structure. The above JSON example can be represented in a template document 602a as shown in FIG. 6A, having identifier fields 604 and content fields 606. Each template document can be given a unique ID, which may for example be placed at the beginning of each identifier field in the template document. In the template document 602a, the unique ID is "1000".

Figure 6B:
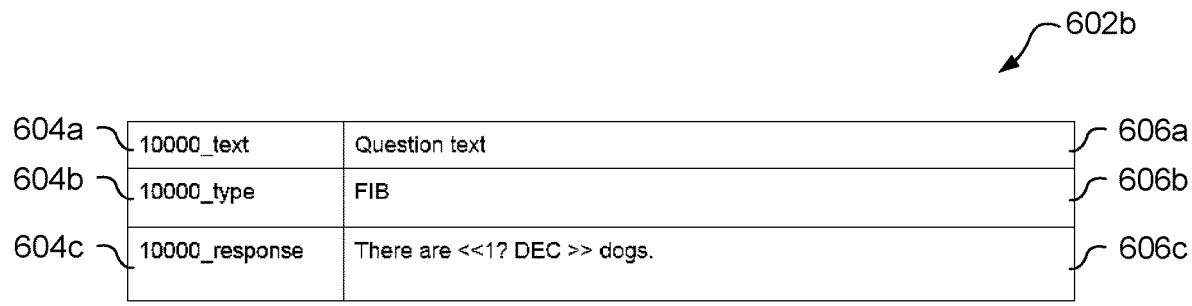

FIG. 6B shows an exemplary definition of a question template document 602b. The question template document has three main identifier fields 604a-c: text, type, and response; with associated content fields 606a-c. The data in the content field 606a may comprise question text or any text that does not have an input box/dropdown inside it. The content field 606a may have text, math expressions, and/or images inside. The data in the content field 606b may indicate the question type, which could for example be Fill-in-the-Blank (FIB or FITB), Multiple Choice (MC), Multiple Select (MS), Drop-Down (DD), etc. The data in the content field 606c may for example specify that inputs are inside sentences or equations. In the example template document 602b, the format to indicate inputs uses double angle brackets, the input number, question mark, then the type of the input. The type of input can include, among other things, integers, decimals, fractions, exponentials, etc. Multiple FITB or multiple DD may also be used inside a content field, provided they are numbered accordingly.

Figure 6C:
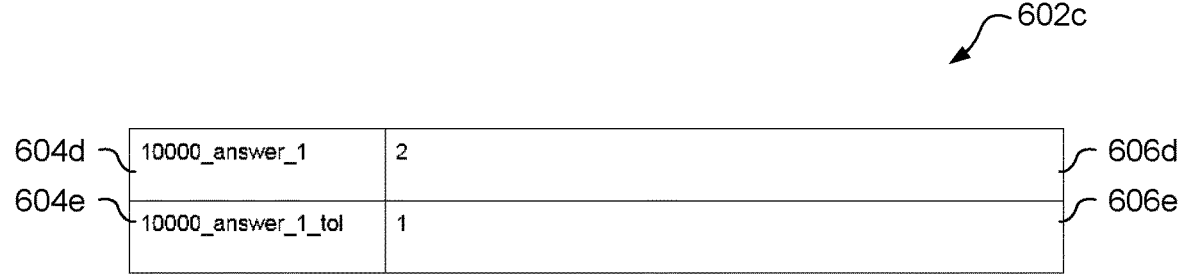

FIG. 6C shows an exemplary definition of an answer template document 602c for providing answers and distractors to a FITB question. The answer template document 602c has two main identifier fields 604d-e: answer and answer tolerance; with associated content fields 606d-e. As depicted in the template document 602c, the identifier fields 604d-e are numbered to match the FITB number. From the content fields 606d-e, it may be seen that in this example the answer is 2, but 1 and 3 are also acceptable answers.

For more complex questions/answers (e.g. a question with two or more inputs), another identifier field such as "1000_random" may be used to randomize the order of responses for multiple choice, multiple select, and/or drop-down questions. If the content field associated with the identifier field "1000_random" is "false", then the answers and options will be locked in the order they are given. Other types of data can also be included in the template documents, including but not limited to various metadata (e.g. standard information and Depth of Knowledge information), images, and/or various text. For further examples, FIGS. 6D-F show sample assessment templates, where template document 602d is for a two decimal fill-in-the-blank type question, template document 602e is for a multiple choice type question, and template document 602f is for a multiple select type question.

Figure 7:
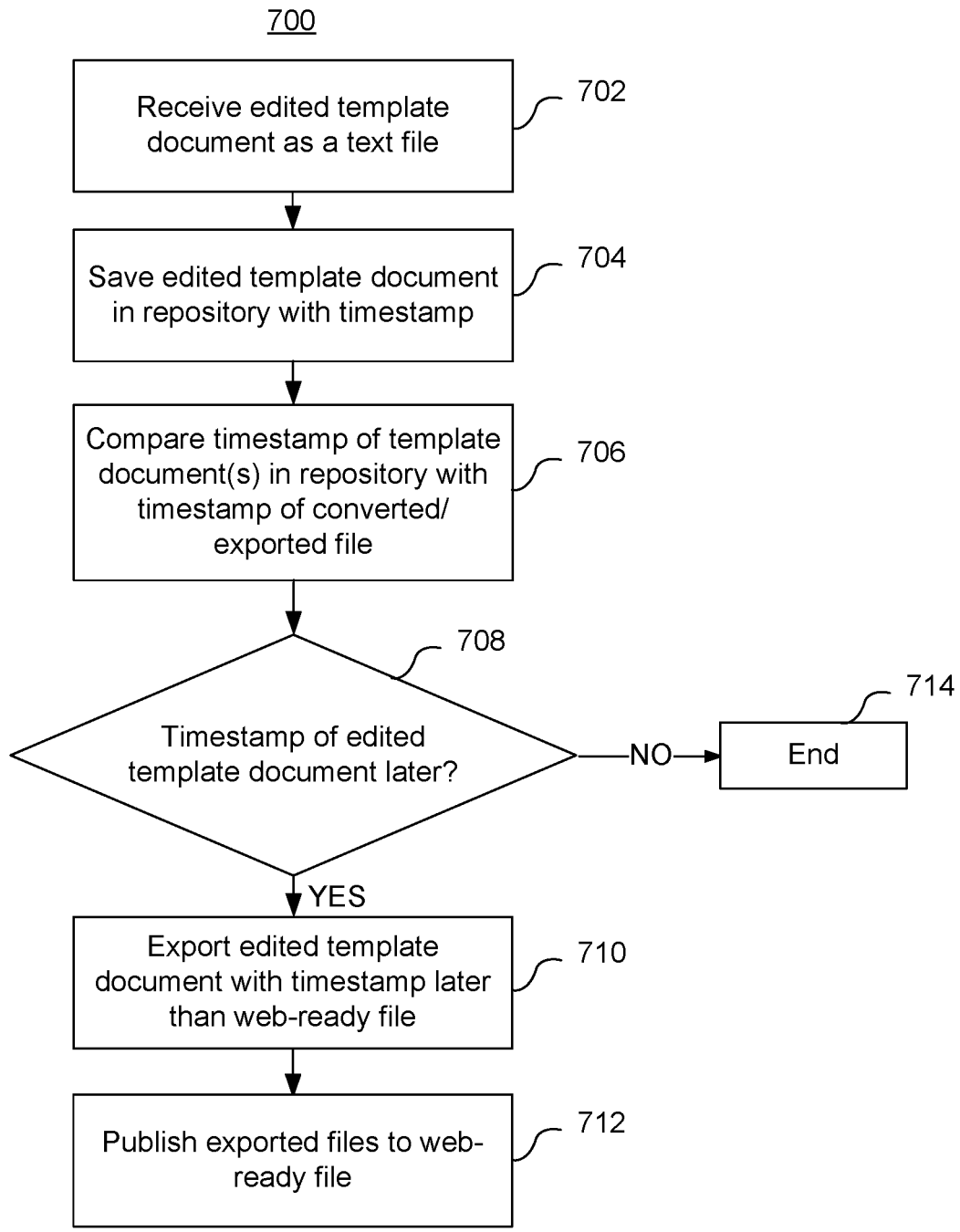
FIG. 7 shows a method for receiving edited template documents.

FIG. 7 shows a method 700 for receiving edited template documents. As previously described, the systems and methods disclosed herein allow for incremental improvements to be made to files to be published. When a storage repository 106 is used in the system to store and timestamp documents at various stages of the publishing process, any changes or edits to files can be easily identified and may initiate the publishing process. In some embodiments, the publishing server 102 may provide a web portal that where the client can login and upload any updated files (e.g. as a zip file) to an online "drop box".

An edited template document is received as a text file (702), and the edited template document is saved in the storage repository with a timestamp (704). The timestamp of the document(s) corresponding to the next stage of the publishing process (e.g. a converted file or exported file) stored in the storage repository is compared with the timestamp of the edited template document (706), and a determination is made as to whether the timestamp of the edited template document is later than the timestamp of the converted file or exported file (708). If the timestamp of the edited template document is not later than the timestamp of the converted/exported file (NO at 708), then the publishing of the web-ready file was performed using the most recent template document and the process ends (714). If the timestamp of the edited template document is later than the timestamp of the converted/exported file (YES at 708), the edited template document is exported (710) and the web-ready file is generated from the exported file (712).

The above method may also apply in cases where a web-ready file is published from multiple template documents. In such a scenario, only template document(s) having a timestamp later than the timestamp of the converted/exported files are exported. Accordingly, only newly edited documents from among the multiple template documents are exported, which reduces processing requirements. There is then a collection of exported files (some previously stored in the storage repository and some newly generated) from which the web-ready file can be published.

Figure 8A:
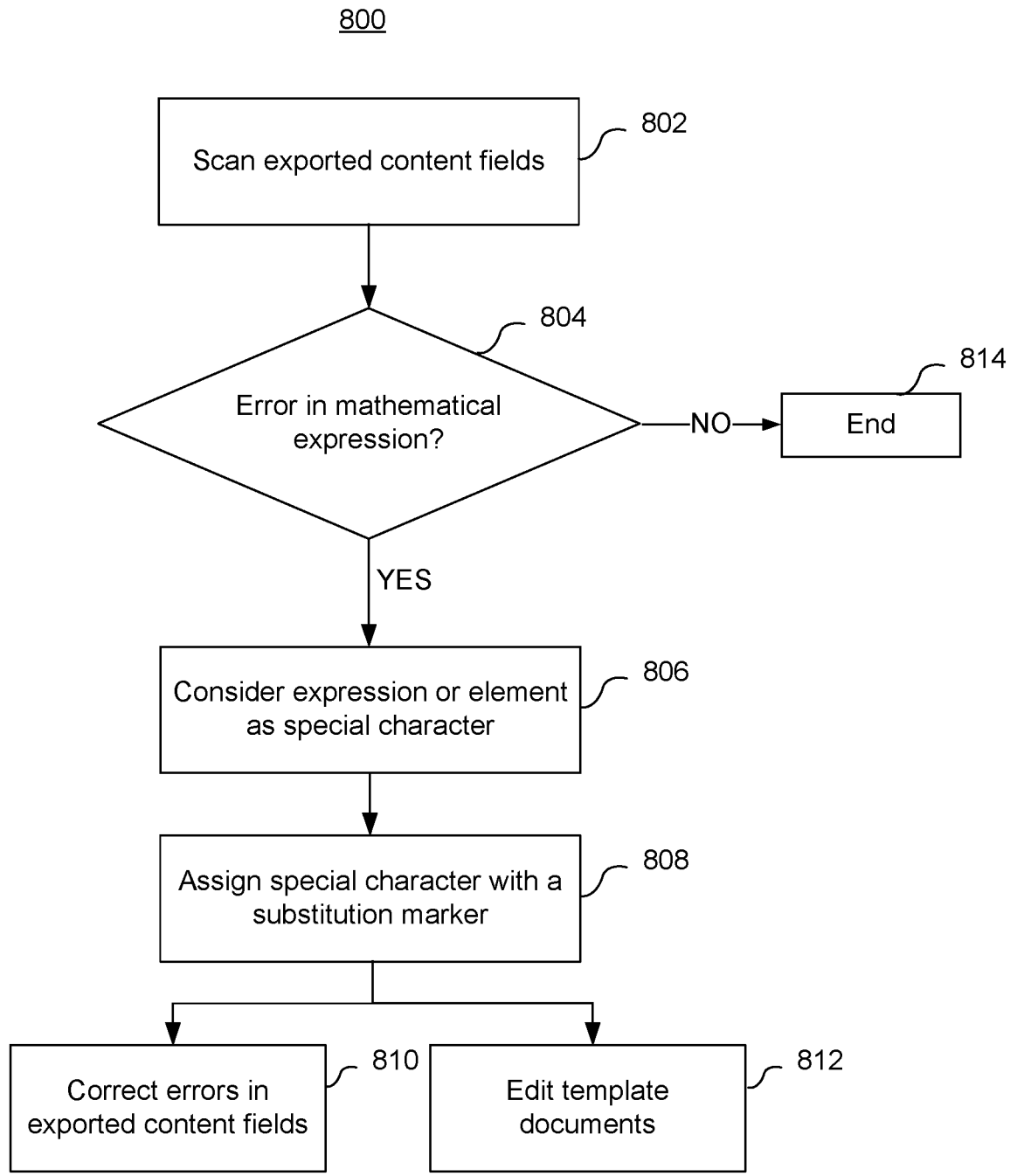
FIGS. 8A and 8B show methods of correcting errors in mathematical expressions.
Figure 8B:
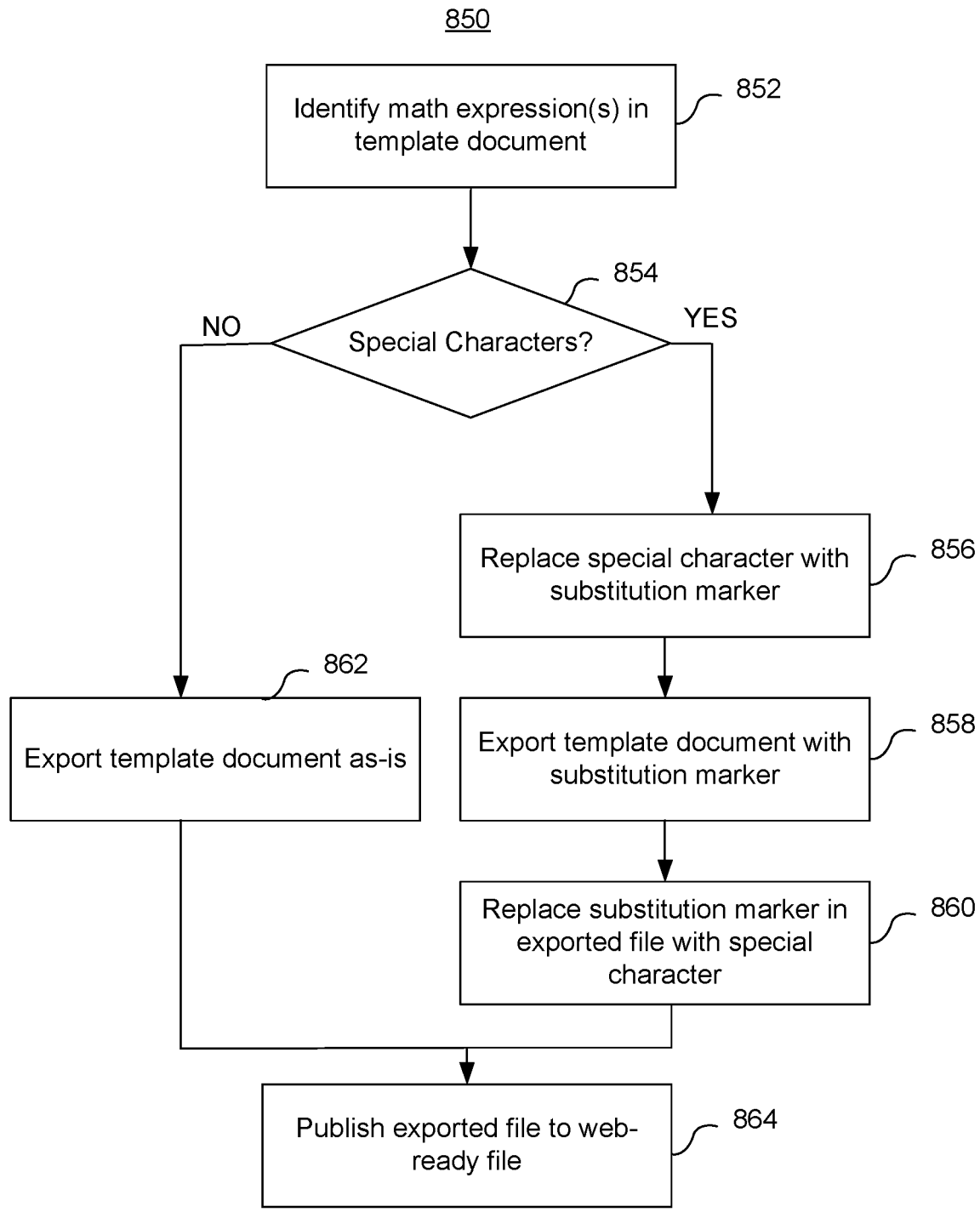

FIGS. 8A and 8B show methods 800 and 850 respectively related to correcting errors in mathematical expressions. Even with the publishing process as described herein, errors in the mathematical expressions may sometimes occur as a result of the converting and exporting processes. However, manually re-keying mathematical expressions in the desired web language format and/or extensive user editing of the formatting of the mathematical expressions can be avoided. The method 800 shown in FIG. 8A is directed to processing an exported file to check for errors in exported mathematical expressions, and the method 850 shown in FIG. 8B is directed to re-processing a template document and/or processing new template documents prior to exporting.

In the method 800, the content fields in the exported file are scanned to check for errors (802). A determination is made if there is an error in any of the mathematical expressions (804). If there is no error in any of the mathematical expressions (NO at 804), the method ends (814). When it is determined that there is an error in a mathematical expression (YES at 804), the mathematical expression or an element of the mathematical expression may be considered to be a special character (806). The special character is assigned with a unique substitution marker (808).

For example, it may be determined that the mathematical expression, or an element of the mathematical expression (e.g. a particular symbol or character) did not export properly. As an example, a mathematical expression of ∠AB=40° contained in the template document may look like ◆AB=40◆ in the exported file. The computer processing device 104b may run a script to identify any such characters "◆" and provide a warning to the user 108 of the error. The mathematical symbols "∠" and "°" may be respectively considered as distinct special characters and assigned unique substitution markers. Alternatively, the entire expression "∠AB=40°" may be considered to be a special character and assigned a unique substitution marker.

The substitution marker may be a sequence of characters that can be exported to a web-compatible language and which are easily identifiable in the exported file. For example, a substitution marker may comprise both an identification marker that allows for the substitution marker to be easily identified in the exported file, and a unique character code that indicates the special character that the substitution marker corresponds to. For example, the symbol "∠" may be considered as a special character and assigned a unique substitution marker "~~ #8736;~~", and the symbol "°" may be considered as a special character and assigned a unique substitution marker "~~ #176;~~". In these examples, the identification marker is the "~~" at the beginning and end of the substitution marker, which allows for the substitution marker to be easily identified in the exported file. A person skilled in the art will readily appreciate that the identification marker "~~" is provided solely as an example and that other identification markers could be used. Also in these examples, the unique character code is "#8736" for the symbol "∠" and "#176" for the symbol "°". A list of special characters and associated substitution markers may be stored, for example in the storage repository 106.

The identified mathematical expression(s) or elements thereof that were determined to have been incorrect may be corrected in the exported files (810). For example, any errors may be corrected in the exported file may be corrected using a "find and replace" operation, or by creating a new error handler to the scripting process, and the web-ready file may be generated from the corrected exported file. Alternatively, the template documents may be edited to replace any special characters with their corresponding substitution markers (812). A Word macro may be run which checks for special characters against a predefined list and substitutes any special characters that are identified with their substitution markers.

As provided in the method 850, math expression(s) are identified in the template document (852). A determination is made if the mathematical expression(s) contain any special characters (854). For example, the mathematical expressions and elements thereof may be cross-referenced against a list of special characters. If a special character is identified (YES at 854), the special character is replaced with its corresponding substitution marker (856), and the template document with the substitution marker therein is exported (858). After the template document is exported, the substitution marker is replaced with the corresponding special character (860), and the web-ready file is generated from the exported file (864).

If there are no special characters identified in the template document (NO at 854), the template document is exported substantially as-is (862) and the web-ready file is generated (864).

Figure 9:
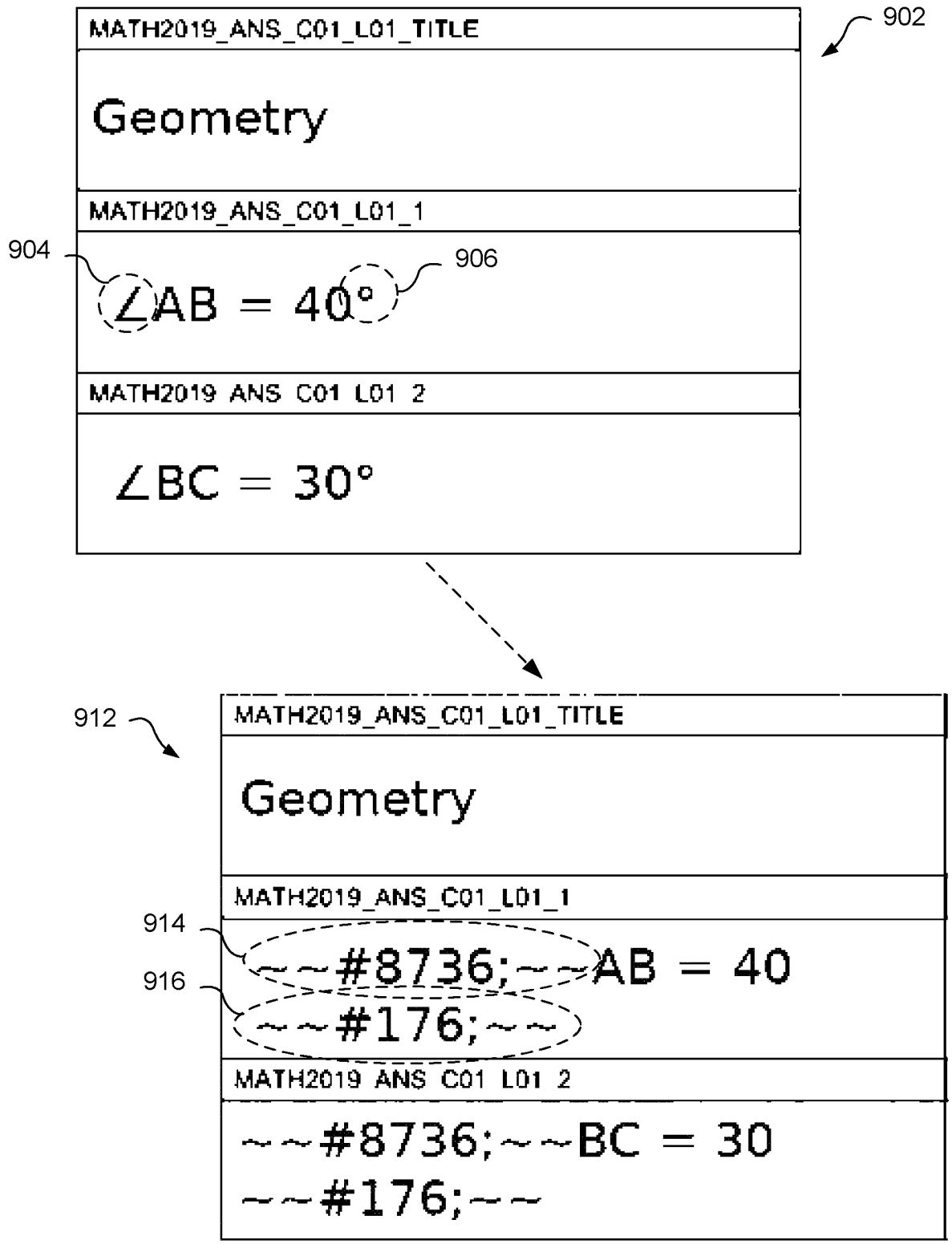
FIG. 9 shows an example of a processed template document in accordance with some embodiments.

FIG. 9 shows an example of a processed template document in accordance with some embodiments. In FIG. 9, the template document 902 contains two special characters 904 and 906. Prior to exporting the template document 902, these two special characters 904 and 906 may be identified as such and replaced with their respective substitution markers. The template document 912 is a processed template document where the special character 904 has been replaced with substitution marker 914 and the special character 906 and has been replaced with substitution marker 916.

It would be appreciated by one of ordinary skill in the art that the system and components shown in FIGS. 1-9 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A method of publishing text files containing mathematical expressions to a web-ready file, comprising:
   receiving a template document as a text file having a template structure comprising a plurality of identifier fields and content fields, the plurality of identifier fields defining how to assemble content for generating the web-ready file, and each of the content fields being associated with a respective of the plurality of identifier fields, wherein the content fields are authored with data, and the data in at least one content field comprises a mathematical expression;
   converting the mathematical expression to a first web language format within the template document;
   exporting the template document to a second web language format to generate an exported file;
   generating a plurality of content snippets from the contents of the exported file, the plurality of content snippets corresponding to the content fields of the template document each being associated with the respective of the plurality of identifier fields; and
   generating the web-ready file by assembling the content snippets in accordance with the respective identifier fields.

2. The method of claim 1, further comprising:
   determining whether a format of the mathematical expression is compatible for converting to the first web language format, and if the format of the mathematical expression is not compatible, modifying the format of the mathematical expression to a format compatible for converting to the first web language format.

3. The method of claim 1, further comprising unencoding the mathematical expression in the first web language format from the second web language format in the exported file.

4. The method of claim 1, wherein the first web language format is MathML.

5. The method of claim 1, wherein the second web language format is HTML.

6. The method of claim 1, wherein the web-ready file is generated in a third web language format, and the contents of the exported file are embedded within the third web language format.

7. The method of claim 6, wherein the third web language format is any of JSON, XML, and SQL inserts.

8. The method of claim 6, wherein generating the web-ready file in the third web language format comprises:
embedding, in the third web language format, the plurality of content snippets to generate the web-ready file in accordance with the respective identifier fields.

9. The method of claim 1, further comprising:
saving the plurality of content snippets in non-volatile storage based on the respective identifier fields associated with the corresponding content fields; or
buffering the plurality of content snippets in memory.

10. The method of claim 6, wherein the plurality of identifier fields are defined according to the third web language format.

11. The method of claim 1, further comprising:
creating a table of contents using a subset of the plurality of identifier fields or content fields; and
including the table of contents in the web-ready file.

12. The method of claim 1, further comprising:
processing the contents of the exported file to check each content field for errors; and
if there is an error in the contents of the exported file, outputting a warning.

13. The method of claim 1, further comprising:
processing the contents of the exported file to check each content field for image references; and
adding images corresponding to the image references to the web-ready file.

14. The method of claim 1, further comprising one or more of:
generating a new web application using the web-ready file;
modifying an existing web application using the web-ready file; and
creating an offline file from the web-ready file.

15. The method of claim 1, wherein the template document is received through a web portal from a user.

16. The method of claim 1, wherein the template structure is uniquely defined for a desired output of the web-ready file.

17. The method of claim 1, wherein the template structure is one of a plurality of template structures that are predefined for standardized outputs of web-ready files.

18. A document publishing system for publishing text files containing mathematical expressions to a web-ready file, comprising:
a publishing server, configured to:
receive a template document as a text file having a template structure comprising a plurality of identifier fields and content fields, the plurality of identifier fields defining how to assemble content for generating the web-ready file, and each of the content fields being associated with a respective of the plurality of identifier fields, wherein the content fields are authored with data, and the data in at least one content field comprises a mathematical expression; and
one or more computer processing devices, configured to:
convert the mathematical expression to a first web language format within the template document;
export the template document to a second web language format to generate an exported file;
generate a plurality of content snippets from the contents of the exported file, the plurality of content snippets corresponding to the content fields of the template document each being associated with the respective of the plurality of identifier fields; and
generate the web-ready file by assembling the contents snippets in accordance with the respective identifier fields.

19. The system of claim 18, wherein the publishing server is further configured to:
task a target computer of the one or more computer processing devices to perform one or more of: converting the mathematical expression, exporting the template document, and generating the web-ready file; or
add one or more of the template document, the exported file, and the web-ready file to a message queue that the one or more computer processing devices are listening to.

20. The system of claim 18, further comprising a web front end providing a web portal through which the template document is received.

21. The system of claim 18, further comprising:
a storage repository storing and timestamping one or more of the template document, the exported file, and the web-ready file.

22. A method of publishing text files containing mathematical expressions to a web-ready file, comprising:
receiving a template document as a text file having a template structure comprising a plurality of identifier fields and content fields, each of the content fields being associated with a respective of the plurality of identifier fields, wherein the content fields are authored with data, and the data in at least one content field comprises a mathematical expression;
converting the mathematical expression to a first web language format within the template document;
exporting the template document to a second web language format to generate an exported file; and
generating the web-ready file from the exported file by assembling contents of the exported file in accordance with the plurality of content fields and associated respective identifier fields defined in the template document,
wherein the web-ready file is generated in a third web language format, and the contents of the exported file are embedded within the third web language format, and
wherein generating the web-ready file in the third web language format comprises generating a plurality of content snippets from the contents of the exported file, the plurality of content snippets corresponding to the content fields of the template document; and embedding, in the third web language format, the plurality of content snippets to generate the web-ready file in accordance with the respective identifier fields.

23. The method of claim 22, wherein generating the web-ready file in the third web language format further comprises:
saving the plurality of content snippets in non-volatile storage based on the respective identifier fields associated with the corresponding content fields; or
buffering the plurality of content snippets in memory.

* * * * *